(12) United States Patent
Zamarreno Ramos (10) Patent No.: US 11,146,173 B1
(45) Date of Patent: Oct. 12, 2021

(54) STARTUP OF POWER CONVERTER WITH SWITCHED-CAPACITOR CIRCUIT

(71) Applicant: pSemi Corporation, San Diego, CA (US)

(72) Inventor: Carlos Zamarreno Ramos, Littleton, CO (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 17/017,129

(22) Filed: Sep. 10, 2020

(51) Int. Cl.
| | |
|---|---|
| *G05F 1/10* | (2006.01) |
| *G05F 3/02* | (2006.01) |
| *H02M 3/07* | (2006.01) |
| *H02M 1/36* | (2007.01) |
| *H02M 1/00* | (2006.01) |

(52) U.S. Cl.
CPC ............... *H02M 3/07* (2013.01); *H02M 1/36* (2013.01); *H02M 1/0012* (2021.05)

(58) Field of Classification Search
CPC ........ H02M 3/07; H02M 3/073; H02M 7/103; H02M 7/106; H02M 7/10; H02M 2003/077; G11C 5/145; G05F 3/205
USPC ....................................... 327/536; 363/59–60
See application file for complete search history.

(56) References Cited

U.S. PATENT DOCUMENTS

| | | | |
|---|---|---|---|
| 10,263,514 | B1 | 4/2019 | Aboueldahab |
| 10,468,978 | B2 | 11/2019 | Zhang et al. |
| 10,680,512 | B2 | 6/2020 | Babazadeh et al. |
| 2018/0358896 | A1* | 12/2018 | Puggelli .................. H02M 5/32 |
| 2019/0379287 | A1* | 12/2019 | Zhang .................... H02M 7/487 |

OTHER PUBLICATIONS

Low, et al., "Startup of Switched Capacitor Step-Down Power Converter", provisional patent application filed in the USPTO dated Feb. 6, 2020, U.S. Appl. No. 62/971,094, 83 pgs.
Low, Aichen, "Power Converters with Integrated Bidirectional Startup", patent application filed in the USPTO dated Jan. 22, 2020, U.S. Appl. No. 16/749,844, 47 pgs.

* cited by examiner

*Primary Examiner* — Quan Tra
*Assistant Examiner* — Anh-Quan Tra
(74) *Attorney, Agent, or Firm* — Jaquez Land Greenhaus & McFarland LLP; John Land, Esq.

(57) ABSTRACT

Startup charge balancing circuits and methods for capacitive charge pumps that avoid large in-rush currents and resulting voltage spikes. Embodiments include a charge balance circuit coupled to a corresponding charge pump capacitor of a charge pump. The charge balance circuit includes a comparator that compares the output voltage of the charge pump to a feedback voltage derived from the voltage across the corresponding charge pump capacitor. In response, either a constant current source or a constant current sink is coupled to the charge pump capacitor. Current sourcing or sinking continues until the voltage across the corresponding charge pump capacitor approximates a target voltage, at which point the comparator output toggles, which results in uncoupling of the coupled current source or current sink from the corresponding charge pump capacitor. Embodiments only need one current sink and one current source per charge pump capacitor, and charge balancing is independent of leakage currents.

21 Claims, 6 Drawing Sheets

STARTUP OF POWER CONVERTER WITH SWITCHED-CAPACITOR CIRCUIT

BACKGROUND

(1) Technical Field

This invention relates to electronic circuits, and more particularly to power converter circuits, including DC-DC converter circuits.

(2) Background

Many electronic products, particularly mobile computing and/or communication products and components (e.g., notebook computers, ultra-book computers, tablet devices, LCD and LED displays) require multiple voltage levels. For example, radio frequency transmitter power amplifiers may require relatively high voltages (e.g., 12V or more), whereas logic circuitry may require a low voltage level (e.g., 1-2V). Still other circuitry may require an intermediate voltage level (e.g., 5-10V).

Power converters are often used to generate a lower or higher voltage from a common power source, such as a battery. One type of power converter comprises a converter circuit (e.g., a charge pump based on a switch-capacitor circuit), control circuitry, and, in some embodiments, auxiliary circuitry such as bias voltage generator(s), a clock generator, a voltage regulator, a voltage control circuit, etc. Power converters which generate a lower output voltage (e.g., $V_{OUT}$) level from a higher input voltage (e.g., $V_{IN}$) power source are commonly known as step-down or buck converters, so-called because $V_{OUT}<V_{IN}$, and hence the converter is "bucking" the input voltage. Power converters which generate a higher output voltage level from a lower input voltage power source are commonly known as step-up or boost converters, because $V_{OUT}>V_{IN}$. In many embodiments, a power converter may be bi-directional, being either a step-up or a step-down converter depending on how a power source is connected to the converter. As used in this disclosure, the term "charge pump" refers to a switched-capacitor circuit configured to boost or buck $V_{IN}$ to $V_{OUT}$. Examples of such charge pumps include cascade multiplier, Dickson, ladder, series-parallel, Fibonacci, and doubler switched-capacitor circuits, all of which may be configured as a multi-phase or a single-phase circuit. As is known in the art, an AC-DC power converter can be built up from a DC-DC power converter by, for example, first rectifying an AC input to a DC voltage and then applying the DC voltage to a DC-DC power converter.

Figure 1:
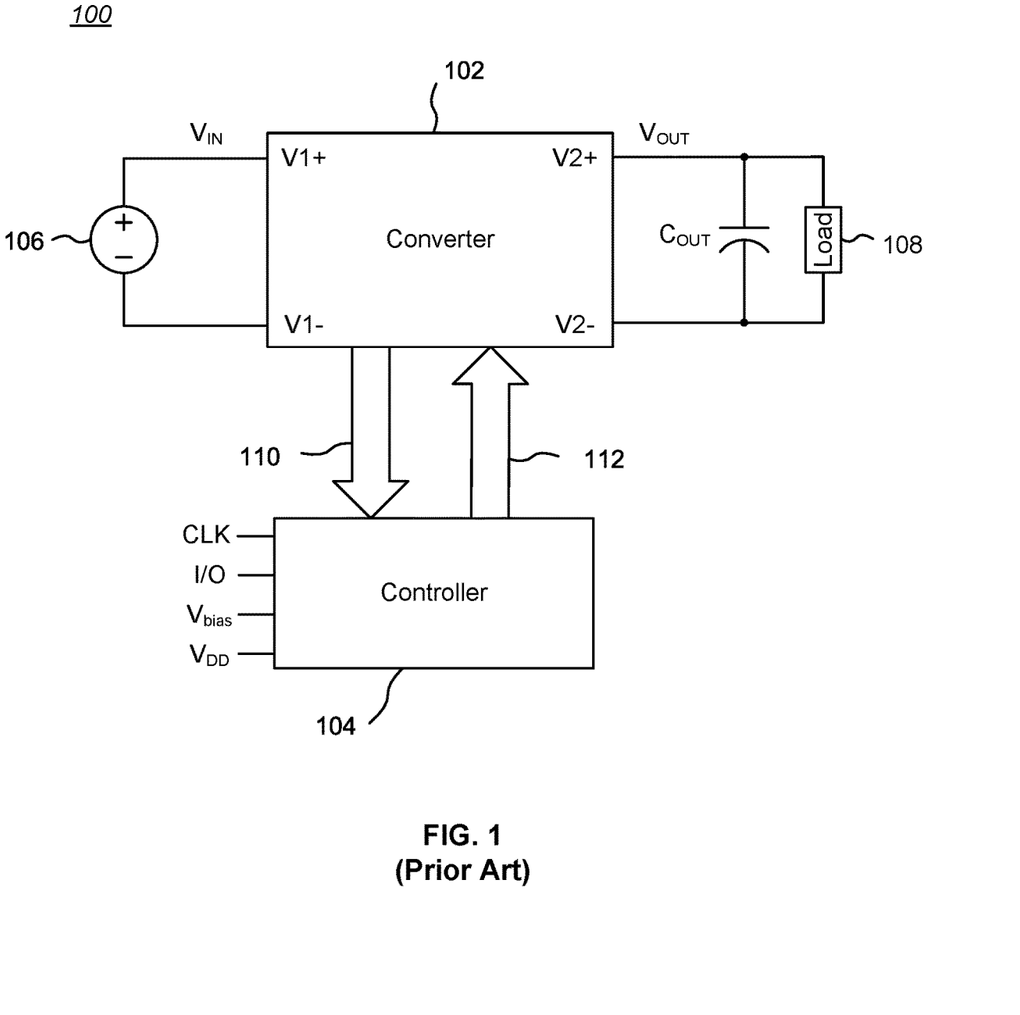
FIG. 1 is a block diagram of a prior art step-down power converter, for $V_{IN} > V_{OUT}$.

FIG. 1 is a block diagram of a prior art step-down power converter 100, for $V_{IN}>V_{OUT}$. In the illustrated example, the power converter 100 includes a converter circuit 102 and a controller 104. The converter circuit 102 may be, for example, a charge pump, and is configured to receive an input voltage $V_{IN}$ from a voltage source 106 at terminals V1+, V1−, and transform the input voltage $V_{IN}$ into a lower output voltage $V_{OUT}$ at terminals V2+, V2−. The output voltage $V_{OUT}$ may be coupled across an output capacitor $C_{OUT}$ and a load 108.

The controller 104 receives a set of input signals and produces a set of output signals. Some of these input signals arrive along an input-signal path 110. These input signals carry information that is indicative of the operational state of the converter circuit 102. The controller 104 also receives at least a clock signal CLK and may receive one or more external input/output (I/O) signals that may be analog, digital, or a combination of both. Based upon the received input signals, the controller 104 produces a set of control-signals 112 that control the internal components of the converter circuit 102 (e.g., internal switches, such as low voltage FETs, especially MOSFETs, and stacks of MOSFETs if higher voltages are to be handled) to cause the converter circuit 102 to buck $V_{IN}$ to $V_{OUT}$. In some embodiments, an auxiliary circuit (not shown) may provide various signals to the controller 104 (and optionally directly to the converter circuit 102), such as the clock signal CLK, the input/output signals I/O, as well as various voltages, such as a general supply voltage $V_{DD}$ and a transistor bias voltage $V_{BIAS}$. In other examples, the controller 104 may also be configured to operate the converter circuit 102 as a step-up, or boost, power converter, for $V_{IN}<V_{OUT}$.

Figure 2:
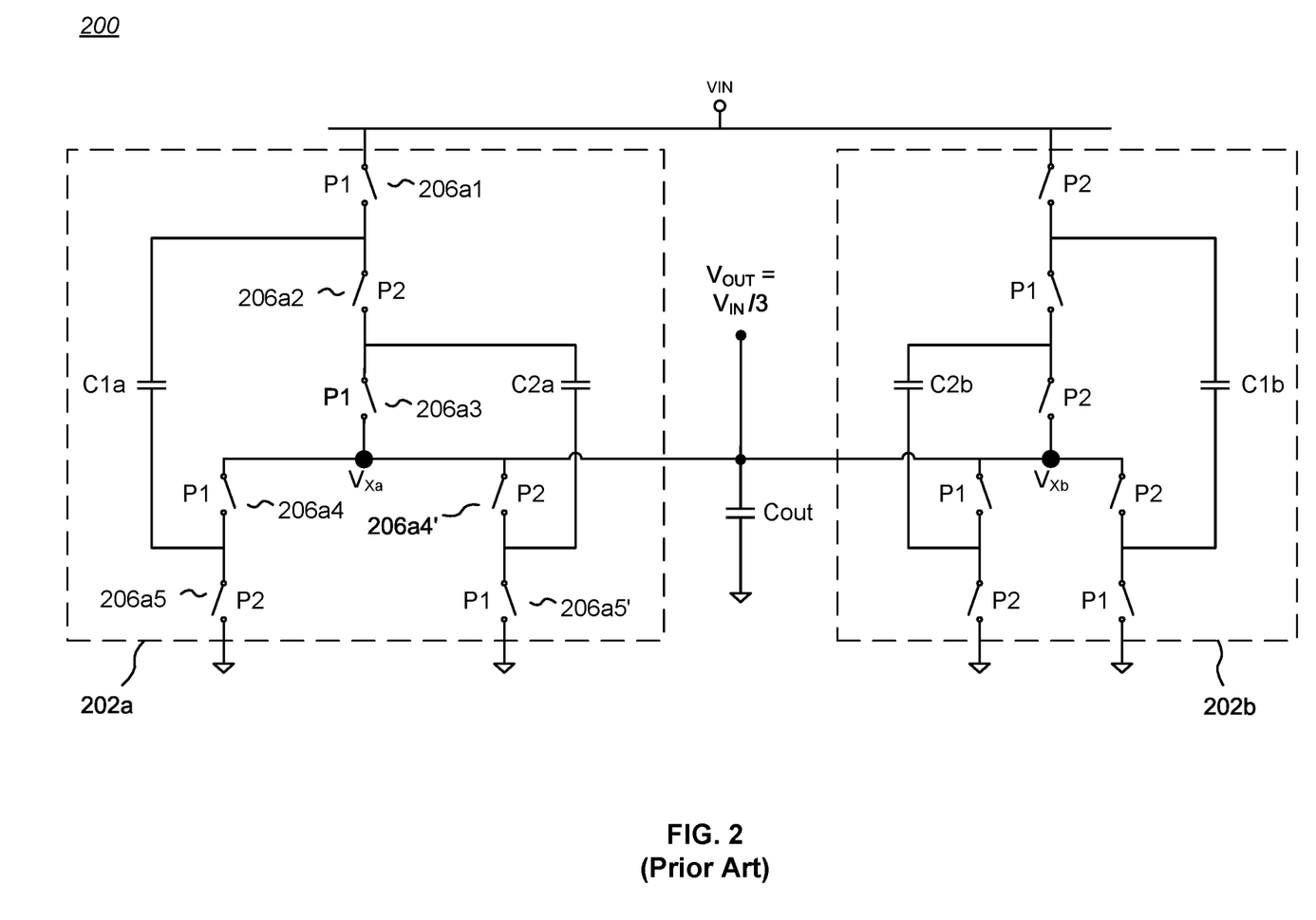
FIG. 2 is a schematic diagram of a prior art two-phase divide-by-3 Dickson converter that includes opposite-phase sections.

As noted above, the converter circuit 102 may be implemented in many different forms. As just one example, FIG. 2 is a schematic diagram of a prior art two-phase divide-by-3 Dickson converter 200 that includes opposite-phase sections 202a, 202b. The left section 202a illustrated in FIG. 2 includes three series-connected switches 206a1-206a3 coupled in series to both a first branch comprising two series-connected switches 206a4 and 206a5, and a second branch comprising two series-connected switches 206a4' and 206a5'. Each charge pump switch 206x in FIG. 2 may comprise, for example, one or more FETs, including one or more MOSFETs. The OPEN or CLOSED state of the switches 206x is controlled by either a first clock signal P1 or a second clock signal P2, which are generally non-overlapping and complementary clock signals.

Coupled between a first upper pair of switches 206a1, 206a2 and a first branch pair of switches 206a4, 206a5 is a first charge transfer capacitor C1a. Coupled between a second upper pair of switches 206a2, 206a3 and a second branch pair of switches 206a4', 206a5' is a second charge transfer capacitor C2a. The charge transfer capacitors are also commonly known as "fly capacitors" or "pump capacitors" and may be external components coupled to an integrated circuit embodiment of the converter circuit 200, or may be internal components of an integrated circuit embodiment of the converter circuit 200.

The output of section 202a is at a node $V_{Xa}$ between the three series-connected switches 206a1-206a3 and the first and second branches of two series-connected switches 206a4, 206a5 and 206a4', 206a5', with node $V_{Xa}$ being coupled to an output capacitor $C_{OUT}$. Similarly, the output of section 202b is at a node $V_{Xb}$, with that node also being coupled to the output capacitor $C_{OUT}$.

As is known in the art, switching signals to MOSFET embodiments of the switches 206x are applied through respective gate driver circuits (not shown) so as to provide suitable voltage levels for setting each MOSFET switch to an OPEN (blocking) state or to a CLOSED (conducting) state. Such gate driver circuits may also be integrated as elements of an integrated circuit embodiment of the converter circuit 200.

The components of the right section 202b illustrated in FIG. 2 are essentially identical to those in the left section 202a. In operation, the polarity of the clock signals P1, P2 operating the switches of the right section 202b are 180° out-of-phase with respect to the clock signals P1, P2 operating the switches of the left section 202a (switch reference labels have been omitted from the right section 202b to avoid unnecessary clutter). Pairing opposite-phase sections 202a, 202b may provide for increased output current and a smoother output voltage at $V_{OUT}$, among other advantages.

In this example, with two charge transfer capacitors per section 202a, 202b, the converter 200 divides $V_{IN}$ to an output voltage $V_{OUT}=V_{IN}/3$. More generally, the number and configuration of the charge transfer capacitors in each topological state of a converter sets the voltage conversion ratio for either buck or boost converters.

In many types of converters, the charge transfer capacitors Cx are charged by multiples of $V_{OUT}$ in steady state operation. For the example converter 200 of FIG. 2, charge transfer capacitors C1a and C1b will be charged by $2*V_{OUT}$, and charge transfer capacitors C2a and C2b will be charged by $1*V_{OUT}$. More generally, if converter division is by a factor of n, there will be (n-1) charge transfer capacitors Cx per section, the maximum voltage across a charge transfer capacitor will be $(n-1)*V_{OUT}$, and the minimum voltage across a charge transfer capacitor will be $1*V_{OUT}$.

Further details of the operation of the divide-by-3 Dickson converter 200, as well as an example of a divide-by-2 Dickson converter, may be found, for example, in U.S. Pat. No. 10,263,514, issued Apr. 16, 2019, entitled "*Selectable Conversion Ratio DC-DC Converter*", assigned to the assignee of the present invention, the contents of which are hereby incorporated by reference. Examples of gate driver circuits may be found, for example, in U.S. patent application Ser. No. 16/749,844, filed Jan. 22, 2020, entitled "*Power Converters with Integrated Bidirectional Startup*", assigned to the assignee of the present invention, the contents of which are hereby incorporated by reference.

Step-down switched-capacitor power converters such as illustrated in FIG. 1 present a number of design challenges. One challenge is that such a power converter must be able to start up from a variety of conditions in a safe manner. These startup conditions vary depending on the initial voltage $V_{OUT}$ at the output capacitor $C_{OUT}$ relative to the voltages at each of the charge pump capacitors Cx (noting that the output capacitor $C_{OUT}$ generally has a capacitance much greater than either the individual capacitances or the collective capacitance of the charge pump capacitors Cx, such as capacitors C1a, C1b, C2a, and C2b in FIG. 2). Starting from an unbalanced voltage condition can create large voltage drops across the very low ON resistance of some of the switches (which may have an ON resistance $R_{ON}$ of just a few milliohms), resulting in excessive in-rush currents which in turn can generate large voltage spikes at the capacitor nodes due to the parasitic inductances associated with the capacitors and the circuit routings. Accordingly, the converter circuit switches as well as the gate driver circuits may be subject to over-voltage conditions, switch stress, and/or excessive in-rush current due to an unbalanced voltage condition.

Examples of scenarios in which voltage imbalances may occur include (1) a precharged output capacitor $C_{OUT}$ where the voltage $V_{OUT}$ across that capacitor is held high (e.g., through another voltage source) while the charge pump capacitors Cx are not sufficiently charged, and (2) a fault condition, such as a short circuit at the output of the converter, where the output capacitor $C_{OUT}$ is fully discharged but the charge pump capacitors Cx are at least partially charged. Some of these challenges may also apply to step-up switched-capacitor power converters.

Accordingly, there is a need for circuits and methods that provide startup charge balancing in switched-capacitor power converters to avoid large in-rush currents and resulting large voltage spikes. The present invention is directed at circuits and methods that meet these challenges and provide power converters that are efficient, low-cost, robust, and high performance.

SUMMARY

The invention encompasses startup charge balancing circuits and methods for switched-capacitor power converters that avoid large in-rush currents and resulting large voltage spikes. The charge balancing circuits are readily integrated with integrated circuit embodiments of power converters, provide fast balancing times, and provide charge balancing rates that are independent of leakage currents.

Embodiments include a charge balance circuit CBx coupled in parallel with a corresponding charge pump capacitor Cx of a charge pump. Each charge balance circuit CBx includes a comparator that compares the output voltage $V_{OUT}$ of the charge pump to a feedback voltage $V_{FB}$ derived from the voltage $V_{Cx}$ across the coupled corresponding charge pump capacitor Cx. A digital controller receives the result of the comparison (either a 1 or a 0) and enables coupling of either a constant current source or a constant current sink to the charge pump capacitor Cx. Current sourcing to or sinking from the coupled charge pump capacitor Cx continues until the voltage $V_{Cx}$ across the coupled charge pump capacitor Cx is approximately equal to a target voltage, at which point the comparator output will toggle, from 0 to 1 or from 1 to 0. The digital controller will uncouple both the current source and current sink from the corresponding charge pump capacitor Cx once the comparator toggles in either direction. Thereafter, any remaining steps of the start-up process may be completed and the charge pump may transition to steady-state operation.

An example embodiment includes a charge balance circuit configured to be coupled to a corresponding charge pump capacitor within a switched-capacitor power converter, including: a comparator having a first input coupled to an output voltage of the switched-capacitor power converter, a second input coupled to a feedback voltage derived from a voltage across the corresponding charge pump capacitor, and an output providing a signal indicative of the relative values of the output voltage of the switched-capacitor power converter with respect to the feedback voltage; a ground connection subcircuit configured to selectively couple the corresponding charge pump capacitor to circuit ground; a constant current charge circuit (e.g., a current source) coupled to the comparator output and selectively couplable to the corresponding charge pump capacitor in response to a first value of the comparator output signal; a constant current discharge circuit (e.g., a current sink) coupled to the comparator output and selectively couplable to the corresponding charge pump capacitor in response to a second value of the comparator output signal; and a digital controller coupled to the comparator output and configured to disable the constant current charge circuit and the constant current discharge circuit when the comparator output changes state.

Embodiments of the present invention only need one current sink and one current source per charge pump capacitor, and while constant current sourcing/sinking is triggered in part by the output voltage $V_{OUT}$, $V_{OUT}$ is not used to directly generate that constant current to achieve the target voltage. Accordingly, while each charge balance circuit operates until a balanced condition is reached for a coupled charge capacitor, charge balancing is independent of leakage currents (a problem for some prior solutions).

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The invention encompasses startup charge balancing circuits and methods for switched-capacitor power converters that avoid large in-rush currents and resulting large voltage spikes. The charge balancing circuits are readily integrated with integrated circuit embodiments of a power converter, provide fast balancing times, and provide charge balancing rates that are independent of leakage currents.

Charge Pump States

In general, a switched-capacitor power converter/charge pump will operate in at least one of three distinct states: a steady-state, a shutdown state, and a startup state. During the steady-state or "normal" operation state in which a charge pump is ready to support and does support load currents, the charge pump receives an input voltage $V_{IN}$ and transforms it, by switching connections to the pump capacitors Cx, into an output voltage $V_{OUT}$ that is a fraction or multiple of $V_{IN}$. In the shutdown state, there is no charge pump switching activity. In the startup state, a voltage difference is presented across the input terminals of the charge pump and some internal circuit activity may be enabled to eventually cause the charge pump to begin switching in order to transfer charge from the voltage source at the input to the output voltage using the pump capacitors Cx—that is, to transition from the shutdown state to steady-state operation. In some embodiments, the startup state may include (1) a pre-switching period in which some circuitry in the charge pump is active (e.g., to rebalance capacitor nodes) but charge pump switching is disabled (where charge pump switching is defined as applying clock signals P1 and P2 as generated by controller 104 to control the charge pump switches, such as charge pump switches 206x in FIG. 2), and (2) a subsequent switching period in which charge pump switching commences but steady-state operation is not yet achieved.

The voltage across any one pump capacitor Cx relative to the voltage across other pump capacitors Cx, as well as relative to the voltage across the output capacitor $C_{OUT}$, may be such that in the first few switching cycles, without mitigating circuitry, the charge pump switches may experience voltage stress and/or the in-rush current at the charge pump input and output terminals may be excessive. Accordingly, as noted above, during the startup phase it may be necessary to first rebalance the voltage on the pump capacitors with respect to the voltage on the output capacitor (noting that the output capacitor may comprise multiple individual capacitors).

In particular, there is a problem of possible transient voltage stress across the charge pump switches during start-up, when the pump capacitors Cx and the output capacitor $C_{OUT}$ are unbalanced relative to each other, meaning that they have non-zero voltages that deviate significantly from their steady-state values for particular $V_{IN}$ or $V_{OUT}$ values. Further, embodiments of switched-capacitor power converters may be subjected to a variety of capacitor charge states at startup resulting, for example, from startup of the power converter after a long shutdown duration and/or restart of the power converter after a fault condition (e.g., short circuit fault). For example, at startup of such a power converter after a long shutdown duration, none of the capacitors or capacitances $C_{OUT}$ or Cx may be initially precharged (Scenario 1). In other conditions before startup, the pump capacitors Cx may have little or no charge (e.g., due to leakage) while the much larger capacitance $C_{OUT}$ remains precharged (Scenario 2). In still other conditions, such as a startup after a short across the converter load, the pump capacitors Cx may be precharged but $C_{OUT}$ may have partially or fully discharged (Scenario 3). Intermediate conditions may also occur where $C_{OUT}$ and/or the pump capacitors Cx are at varying precharged and/or discharged degrees. A good converter design should be able to deal with all of these startup conditions or any of the possible precharged conditions that may arise.

A possible solution to dealing with an unknown startup charge state for a switched-capacitor power converter would be to discharge all capacitors before startup commences so as to result in a known charge state, or to use high-voltage rated FETs for the charge pump switches so as to mitigate FET over-voltage stress. However, these solutions are inefficient, waste charge (which may be highly undesirable for battery-powered applications), and/or require relatively long startup times to settle into steady-state power converter operation. Furthermore, a particular application, such as a cellular phone, may not tolerate or allow a power converter component to discharge the relatively large output capacitor $C_{OUT}$ without careful controls in place.

A better solution is to utilize a charge balancing circuit to source current to or sink current from the capacitor nodes within a charge pump to achieve a desired respective voltage at such nodes. One such solution is taught in U.S. Patent Application No. 62/971,094, filed Feb. 14, 2020, entitled "Startup of Switched Capacitor Step-Down Power Converter", assigned to the assignee of the present invention, the contents of which are hereby incorporated by reference. In the referenced solution, the output voltage $V_{OUT}$ of a charge pump is sensed and a current proportional to $V_{OUT}$ is generated with a current mirror circuit. If the voltage across any of the charge pump capacitors Cx is lower than a target voltage level, the generated current is injected into those capacitors until they reach the target level (which depends on the division ratio configured in the charge pump). If the voltage across any of the charge pump capacitors Cx is higher than a target voltage level, a current is sunk from those capacitors until they reach the target level. The process is stopped when one or more auxiliary comparators detect that each of the charge pump capacitors Cx is charged to within a desired range (e.g., 80-120%) of the target voltage. However, embodiments may be slow to charge/discharge a charge pump capacitor Cx owing to a relatively large RC time constant, run continuously (and thus may be inefficient), may be sensitive to leakage currents through the current mirror circuit, and force a current source through a resistor to ground (and thus wastes energy).

Improved Solution Overview

Figure 3:
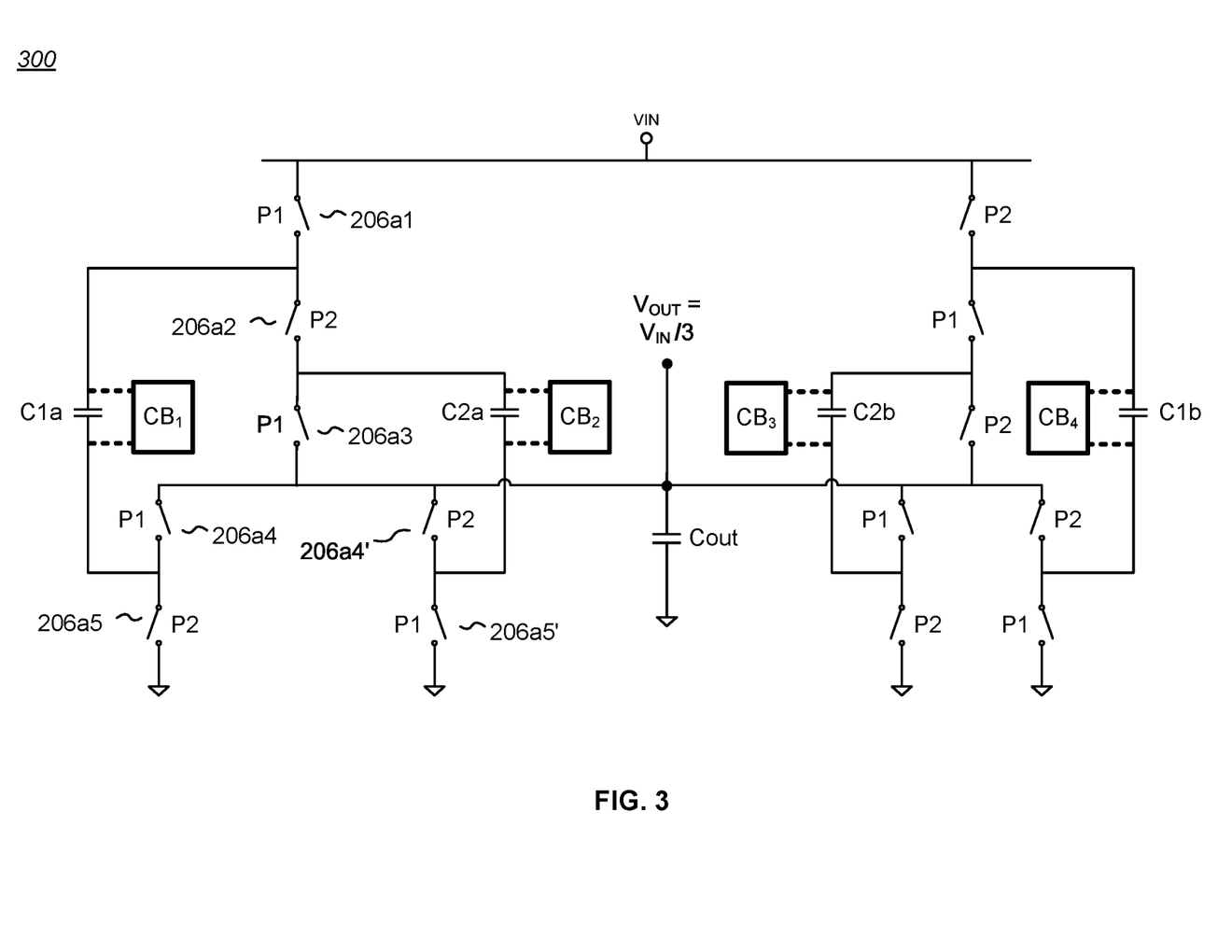
FIG. 3 is a schematic diagram of one embodiment of a charge pump that includes charge balance circuits in accordance with the present invention.

The present invention provides an even better solution that includes embodiments that, compared to prior solutions, are simplified and provide a more robust way of balancing the charge of pump capacitors Cx in a charge pump. For example, FIG. 3 is a schematic diagram of one embodiment of a charge pump 300 that includes charge balance circuits in accordance with the present invention. A charge balance circuit CBx (e.g., $CB_1$-$CB_4$ in FIG. 3) is coupled in parallel with each charge pump capacitor Cx (e.g., C1a, C2a, C2b, C1b in FIG. 3). The connections of the charge balance circuits CBx to corresponding charge pump capacitors Cx are shown as dashed lines to indicate that the charge balance circuits CBx need only be coupled during start-up (and generally only during a pre-switching period of start-up). When the charge balance circuits CBx are engaged, generally the switches (e.g., 206x) of a particular charge pump 300 are set to a desired state needed for the start-up sequence of that charge pump to occur. For example, for the charge pump of FIG. 3, all of the switches of the charge pump 300 controlled by clock signals P1 and P2 may be set to an OPEN state during start-up so as to let the charge balance circuits CBx fully control the voltages across the charge pump capacitors Cx. However, in some embodiments, it may be useful to set some of the switches controlled by clock signals P1 and P2 to a CLOSED state in order to more quickly charge one or more of the charge pump capacitors Cx.

As an overview, each charge balance circuit CBx includes a comparator that compares the output voltage $V_{OUT}$ to a feedback voltage $V_{FB}$ derived from the voltage $V_{Cx}$ across a coupled charge pump capacitor Cx. The feedback voltage $V_{FB}$ may be scaled in value for each charge pump capacitor Cx. A digital controller receives the result of the comparison (either a 1 or a 0) and enables coupling of either a constant current source or a constant current sink to the charge pump capacitor Cx. Current sourcing to or sinking from the coupled charge pump capacitor Cx continues until the voltage $V_{Cx}$ across the coupled charge pump capacitor Cx is approximately equal to a target voltage, at which point the comparator output will toggle, from 0 to 1 or from 1 to 0 (note: the target voltage for each charge pump capacitor Cx generally will be different depending on the charge pump capacitor Cx and the configuration of the charge pump, and is determined by the feedback voltage $V_{FB}$). The digital controller will uncouple both the current source and current sink from the corresponding charge pump capacitor Cx once the comparator toggles in either direction. Thereafter, any remaining steps of the start-up process may be completed and the charge pump may transition to steady-state operation.

Embodiments of the present invention only need one current sink and one current source per charge pump capacitor, and while constant current sourcing/sinking is triggered in part by the output voltage $V_{OUT}$, $V_{OUT}$ is not used to directly generate that constant current to achieve the target voltage. Accordingly, while each charge balance circuit operates until a balanced condition is reached for a coupled charge capacitor, charge balancing is independent of leakage currents (a problem for some prior solutions).

Example Charge Balance Circuit Embodiment

Figure 4A:
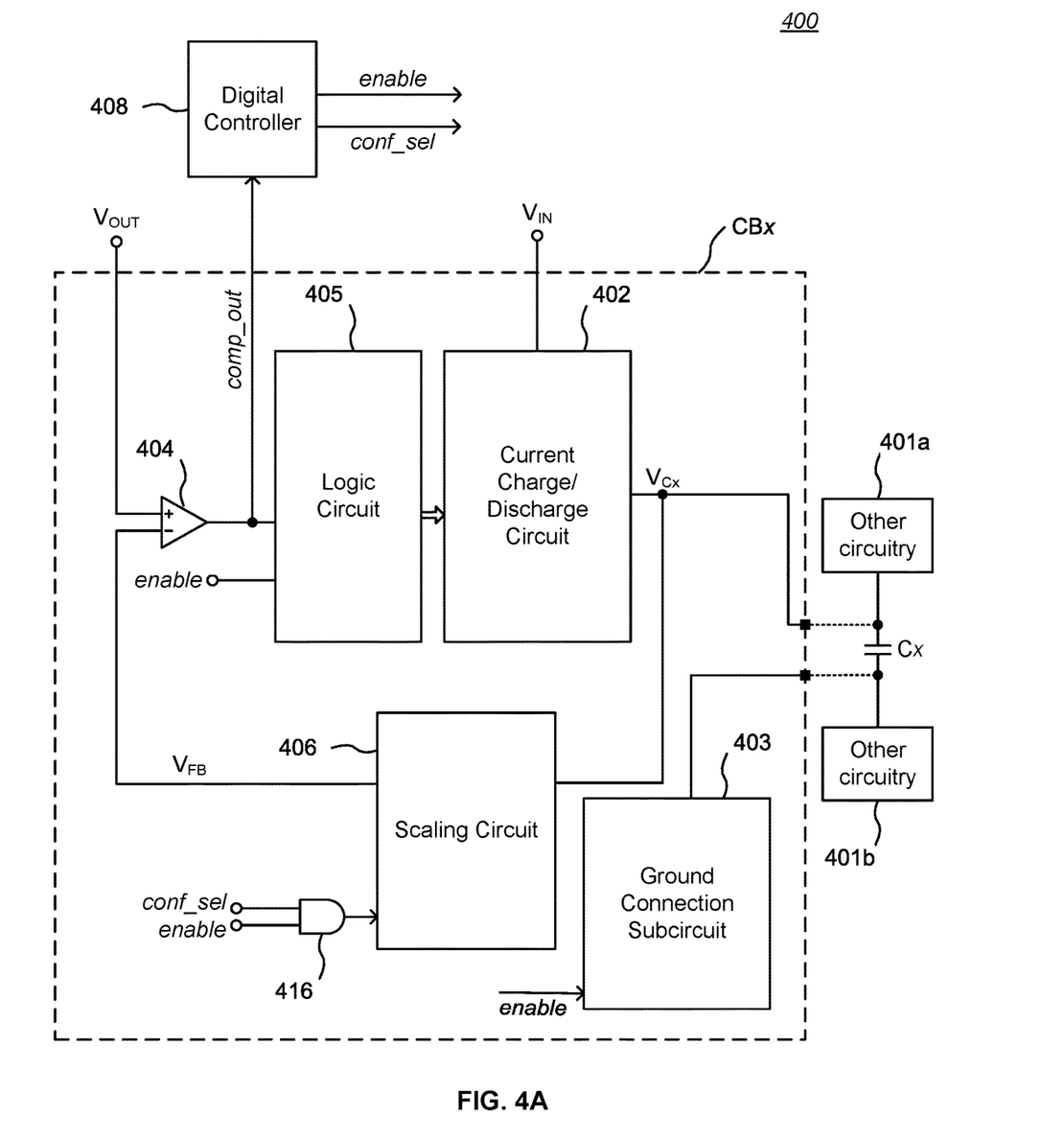
FIG. 4A is a block diagram of one embodiment of a charge balance circuit CBx in accordance with the present invention.
Figure 4B:
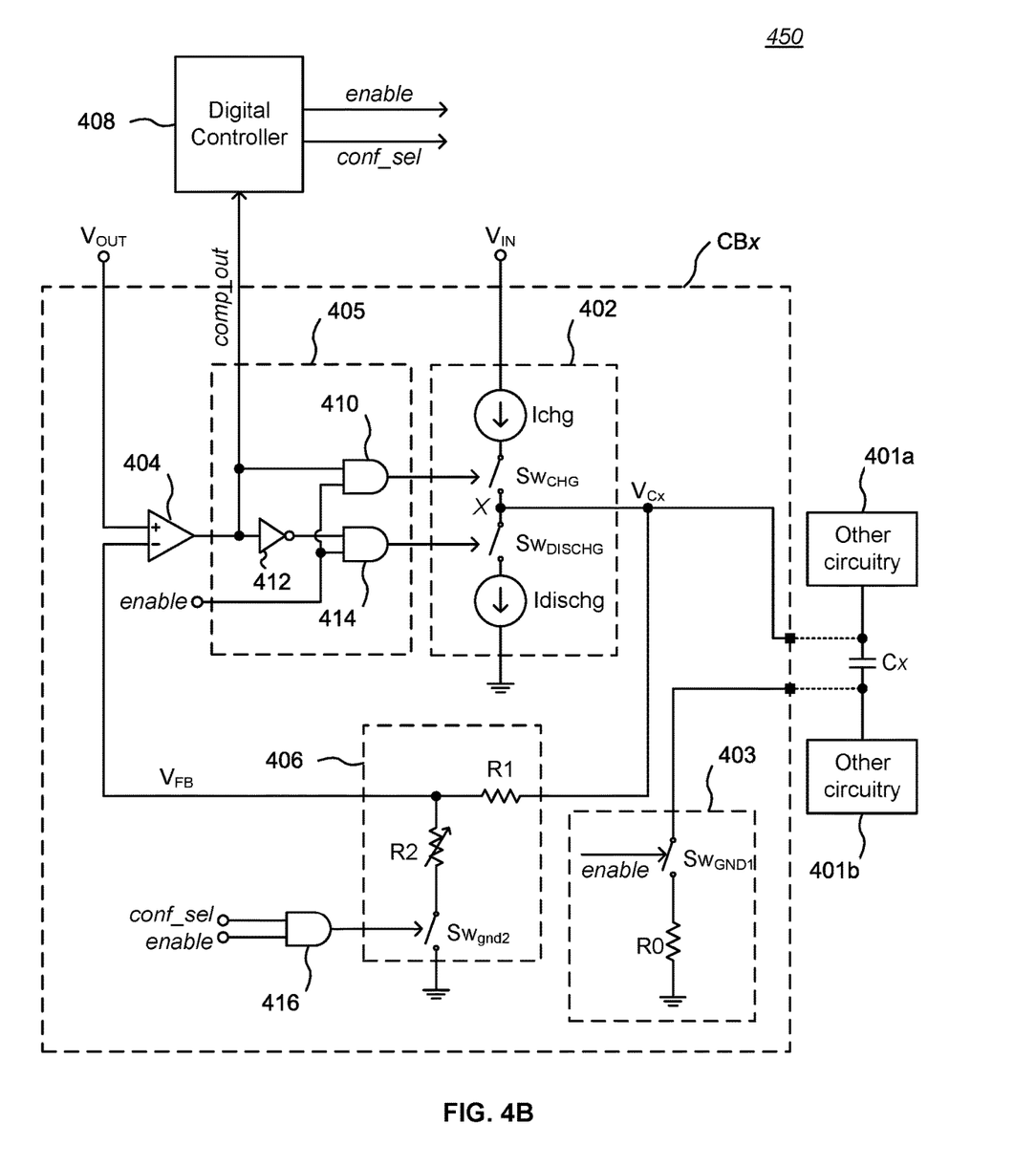
FIG. 4B is a schematic diagram of the charge balance circuit CBx of FIG. 4A showing example circuit detail.

FIG. 4A is a block diagram 400 of one embodiment of a charge balance circuit CBx in accordance with the present invention. FIG. 4B is a schematic diagram 450 of the charge balance circuit CBx of FIG. 4A showing example circuit detail.

We now discuss operation of the exemplary charge balance circuit CBx of FIGS. 4A and 4B in detail. For this example, all charge pump switches (controlled by clock signals P1 and P2 in FIG. 3, for example) are set to OPEN to allow charge balance circuits CBx to operate properly and independently. As shown in FIGS. 4A and 4B, the charge balance circuit CBx is coupled across an associated charge pump capacitor Cx, which is coupled to other circuitry 401a, 401b within the charge pump (e.g., charge pump 300 of FIG. 3). A first terminal (the "top" plate) of the charge pump capacitor Cx is coupled to a current charge/discharge circuit 402. A second terminal (the "bottom" plate) of the charge pump capacitor Cx is selectively couplable through a ground connection subcircuit 403, which may include a switch $Sw_{GND1}$ in series with a resistor R0 coupled to circuit ground (see FIG. 4B).

The current charge/discharge circuit 402 is configured to provide either a constant current source or a constant current sink to the charge pump capacitor Cx until the voltage $V_{Cx}$ across the coupled charge pump capacitor Cx is approximately equal to a target voltage. In the example illustrated in FIG. 4B, the current charge/discharge circuit 402 includes a charging current source Ichg coupled to an input voltage $V_{IN}$ (generally the same $V_{IN}$ that is coupled to the input of the charge pump) and to a node X through a switch $Sw_{CHG}$, and a discharging current sink Idischg coupled to circuit ground and to the node X through a switch $Sw_{DISCHG}$. The voltage at node X, $V_{Cx}$, is the voltage across the associated charge pump capacitor Cx with respect to circuit ground.

The current sources/sinks Ichg, Idischg may be implemented in a number of known ways, such as a current mirror, particularly a MOSFET current mirror. The principal desired characteristic of the current sources/sinks Ichg, Idischg is that they provide an essentially constant current to or from node X in order to charge or discharge the associated charge pump capacitor Cx without incurring excessive current in-rush or out-rush (which is a major aspect of the more general charge pump problem being solved by the charge balance circuit CBx). Accordingly, any current source/sink that regulates the flow of current to approximately a desired level may be used for the current sources/sinks Ichg, Idischg. One of the current sources/sinks, Ichg or Idischg, is selectively coupled to node X during a charge balancing event by an associated switch $Sw_{CHG}$, $Sw_{DISCHG}$ which are ultimately responsive to the relative voltage at the charge pump output, $V_{OUT}$, with respect to the voltage $V_{Cx}$ across the associated charge pump capacitor Cx, as controlled by the exemplary binary-output comparator 404 and logic circuit 405 described below.

In the illustrated detailed example of FIG. 4B, the charge pump output voltage $V_{OUT}$ is coupled to a first input of a binary-output comparator 404. A feedback voltage $V_{FB}$ derived from the voltage $V_{Cx}$ across a coupled charge pump capacitor Cx is coupled to a second input of the binary-output comparator 404. The feedback voltage $V_{FB}$ may be $V_{Cx}$ directly, or $V_{Cx}$ scaled by a scaling circuit 406. The function of the scaling circuit 406 is to adjust the feedback voltage $V_{FB}$ applied to the second input of the binary-output comparator 404 to match the target voltage desired for the associated charge pump capacitor Cx. In the illustrated example, the scaling circuit 406 is implemented as a resistive voltage divider that includes serially-coupled resistors R1 and R2. The values of one or both resistors R1, R2 may be adjustable or settable, for example, during manufacture, testing, after assembly in a product, or by dynamic programming, in order to set a desired scaled value for $V_{FB}$. In the illustrated example, resistor R2 is shown as being adjustable or settable, but in some embodiments only resistor R1 may be adjustable or settable, and in some embodiments both resistors R1, R2 may be adjustable or settable. In some embodiments, resistor R2 may be selectively coupled to circuit ground through a switch $Sw_{GND2}$, as further described below. As should be clear, other scaling circuits that perform essentially the same function may be used instead of the illustrated scaling circuit 406.

In the illustrated example, if $V_{OUT} \geq V_{FB}$, then the output comp_out of the comparator 404 is a binary "1". Conversely, if $V_{OUT} < V_{FB}$, then the output comp_out of the comparator 404 is a binary "0". The output comp_out of the comparator 404 is coupled to a digital controller 408, which may be included as part of the general charge pump controller 104 shown in FIG. 1, and to a logic circuit 405. The logic circuit 405 includes (1) a first AND gate 410, the output of which controls the OPEN or CLOSED state of the switch $Sw_{CHG}$, and (2) an inverter 412 coupled to a second AND gate 414, the output of which controls the CLOSED or OPEN state of the switch $Sw_{DISCHG}$. The outputs of the first AND gate 410 and the second AND gate 414 are thus complementary.

One output of the digital controller 408 is an enable signal that enables or disables the first and second AND gates 410, 414. When the enable signal is "0", both of the AND gates 410, 414 are disabled, switch $Sw_{GND1}$ is set to OPEN, and the switches $Sw_{CHG}$, $Sw_{DISCHG}$ are set to OPEN, thus disconnecting the current sources/sinks Ichg, Idischg from node X. Accordingly, the charge balance circuit CBx is effectively disconnected from the associated charge pump capacitor Cx.

Conversely, when the enable signal is "1", and since the outputs of the first AND gate 410 and the second AND gate 414 are complementary, then (1) one (and only one) of the AND gates 410, 414 outputs a logic "1", and the corresponding switch $Sw_{CHG}$, $Sw_{DISCHG}$ is set to CLOSED, thus coupling the respective current source/sink Ichg, Idischg to node X, (2) the other switch $Sw_{DISCHG}$, $Sw_{CHG}$ is set to OPEN, thus disconnecting the respective current source/sink Idischg, Ichg from node X, and (3) switch $Sw_{GND1}$ is set to CLOSED, completing the circuit to the corresponding capacitor Cx. Accordingly, the charge balance circuit CBx is coupled across the associated charge pump capacitor Cx.

In operation, during a charge balancing event (typically during a pre-switching period of start-up), the digital controller 408 sets the enable signal to "1", thereby enabling the first and second AND gates 410, 414 to respond to the output of the comparator 404. Depending on the relative values of the output voltage $V_{OUT}$ of the switched-capacitor power converter with respect to the feedback voltage $V_{FB}$ (i.e., whether $V_{OUT} \geq V_{FB}$ or if $V_{OUT} < V_{FB}$), charging or discharging of the associated charge pump capacitor Cx commences. Charging or discharging continues until the voltage $V_{Cx}$ across the associated charge pump capacitor Cx reaches a desired target level with respect to the charge pump output voltage $V_{OUT}$, at which point the comparator 404 output, comp_out, toggles state. Any change in comp_out (from 0 to 1 or from 1 to 0) will cause the digital controller 408 to reset the enable signal to "0", thereby disabling charging or discharging of the associated charge pump capacitor Cx. For example, a change in comp_out may be detected within the digital controller 408 by means of a parallel pair of edge-triggered flip-flops, one set to output a "1" on a positive edge transition, and the other set to output a "1" on a negative edge transition.

More specifically, for the illustrated example, if the enable signal is "1" and $V_{OUT} \geq V_{FB}$, then the output of the comparator 404 will be a "1", the first AND gate 410 will set switch $Sw_{CHG}$ to CLOSED, and the second AND gate 414 will set switch $Sw_{DISCHG}$ to OPEN. Current source Ichg will thus be connected to node X and provide an essentially constant current to charge the associated charge pump capacitor Cx, while current sink Idischg is disconnected from node X. When $V_{Cx}$ reaches a desired target level with respect to $V_{OUT}$ (i.e., $V_{OUT} < V_{FB}$), the output of the comparator 404 will toggle to "0", thereby causing the digital controller 408 to reset the enable signal to "0", thereby disabling both the first and second AND gates 410, 414 and opening switches $Sw_{CHG}$, $Sw_{DISCHG}$, and $Sw_{GND1}$. Both current sources/sinks, Ichg, Idischg will thus be disconnected from the associated charge pump capacitor Cx.

Conversely, if the enable signal is "1" and $V_{OUT} < V_{FB}$, then the output of the comparator 404 will be a "0", the first AND gate 410 will set switch $Sw_{CHG}$ to OPEN, and the second AND gate 414 will set switch $Sw_{DISCHG}$ to CLOSED. Current sink Idischg will thus be connected to node X and provide an essentially constant current to discharge the associated charge pump capacitor Cx, while current source Ichg is disconnected from node X. When $V_{Cx}$ reaches a desired target level with respect to $V_{OUT}$ (i.e., $V_{OUT} \geq V_{FB}$), the output of the comparator 404 will toggle to "1", thereby causing the digital controller 408 to reset the enable signal to "0", thereby disabling both the first and second AND gates 410, 414 and opening switches $Sw_{CHG}$, $Sw_{DISCHG}$, and $Sw_{GND1}$. Both current sources/sinks Ichg, Idischg will thus be disconnected from the associated charge pump capacitor Cx.

As should be clear, other circuits may be used to perform the function of coupling only one current source/sink, Ichg or Idischg, to an associated charge pump capacitor Cx during a charge balancing event until $V_{Cx}$ reaches a desired target level, and thereafter disconnecting the current sources/sinks from the associated charge pump capacitor Cx.

In embodiments in which a charge pump may be configured between one of two conversion ratios, such as divide-by-2 or divide-by-3, it may be useful to reconfigure the scaling circuit 406 between different levels of scaling. Accordingly, the digital controller 408 may output a configuration mode signal, conf_sel that is coupled to an AND gate 416 that controls the switch $Sw_{GND2}$ in the example scaling circuit 406. With conf_sel set to "1", the switch $Sw_{GND2}$ is controlled by the enable signal from the digital controller 408. When switch $Sw_{GND2}$ is CLOSED, the scaling circuit 406 outputs $V_{FB}$, which is a scaled version of $V_{Cx}$ that depends on the ratio of R1 and R2. When switch $Sw_{GND2}$ is OPEN, $V_{FB}$ will equal $V_{Cx}$. In a different mode in which conf_sel is set to "0", the switch $Sw_{GND2}$ is OPEN regardless of the value of the enable signal from the digital controller 408 and hence $V_{FB}$ will equal $V_{Cx}$.

Embodiments of the present invention provide a number of advantages over prior solutions. For example, compared to a number of prior solutions, embodiments of the present invention may be implemented with fewer components, thus taking up less area (a valuable commodity) in an integrated circuit implementation.

Another significant advantage is that some embodiments of the present invention may provide balancing times that are about one-third the balancing times of prior art embodiments, or better, thus allowing a charge pump to more rapidly achieve steady-state operation.

Another advantage of embodiments of the present invention is that charge balancing is independent of leakage currents. In some prior solutions, the current injected into or sunk from the charge pump capacitors Cx and the output capacitor $C_{OUT}$ depends on a measurement of the output voltage $V_{OUT}$. Any kind of leakage in any of these capacitive nodes, their associated switches, or the prior charge balance circuit (very typical in high power charge pumps that require massive switches), can jeopardize the target voltage to which the capacitors will end up being charged—that is, the target voltage may not be met at all. In contrast, embodiments of the present invention inject or sink an essentially constant current and stop current injection/sinking when charge balancing is achieved, even in the presence of leakage (as long as the source/sink current is larger than the leakage).

While the examples of usage of the present invention involve a Dickson charge pump, the charge balance circuit CBx may be used in conjunction with many other types of switched-capacitor circuits, including cascade multiplier, ladder, series-parallel, Fibonacci, and doubler switched-capacitor circuits, all of which may be configured as a multi-phase or a single-phase circuit. Charge balancing circuits in accordance with the present invention may be readily integrated with integrated circuit embodiments of such power converters.

Methods

Another aspect of the invention includes methods for balancing charge across a charge pump capacitor within a switched-capacitor power converter.

Figure 5:
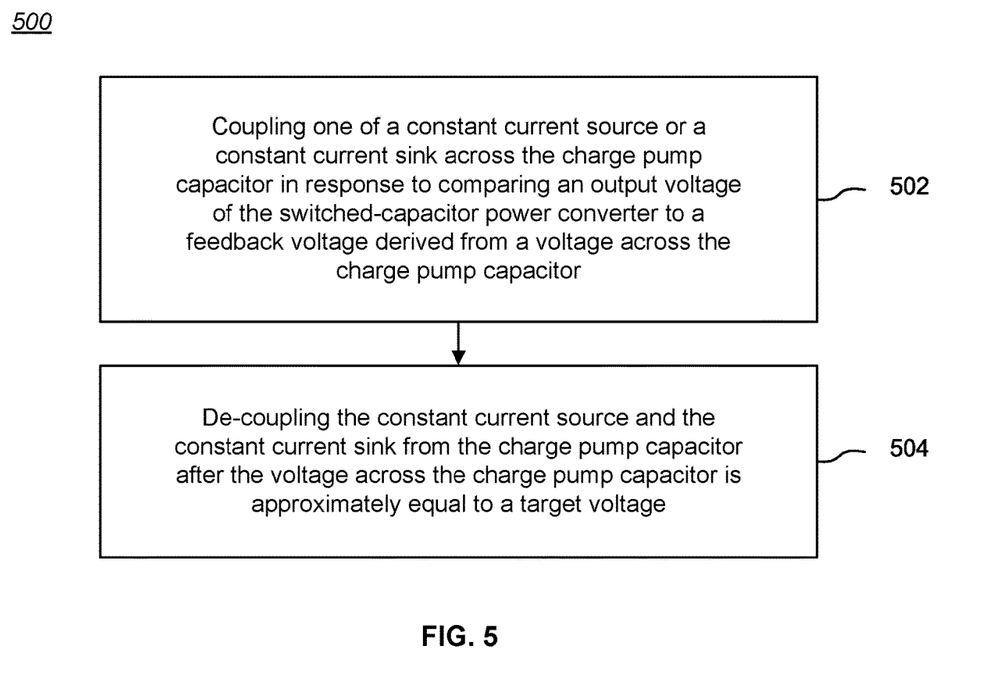
FIG. 5 is a process flow chart showing a method for balancing charge across a charge pump capacitor within a switched-capacitor power converter.

For example, FIG. 5 is a process flow chart 500 showing a method for balancing charge across a charge pump capacitor within a switched-capacitor power converter. The method includes coupling one of a constant current source or a constant current sink across the charge pump capacitor in response to comparing an output voltage of the switched-capacitor power converter to a feedback voltage derived from a voltage across the charge pump capacitor (Block 502); and decoupling the constant current source and the constant current sink from the charge pump capacitor after the voltage across the charge pump capacitor is approximately equal to a target voltage (Block 504).

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, embodiments of the invention may be implemented in other transistor technologies such as bipolar, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or modules for ease of handling, manufacture, and/or improved performance. In particular, IC embodiments of this invention are often used in modules in which one or more of such ICs are combined with other circuit blocks (e.g., filters, passive components, and possibly additional ICs) into one package. The ICs and/or modules are then typically combined with other components, often on a printed circuit board, to form an end product such as a cellular telephone, laptop computer, or electronic tablet, or to form a higher level module which may be used in a wide variety of products, such as vehicles, test equipment, medical devices, etc. Through various configurations of modules and assemblies, such ICs typically enable a mode of communication, often wireless communication.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A charge balance circuit configured to be coupled to a corresponding charge pump capacitor within a switched-capacitor power converter, including a current charge/discharge circuit configured to selectively provide either a constant current source or a constant current sink to the corresponding charge pump capacitor as a function of a voltage across the corresponding charge pump capacitor and an output voltage of the switched-capacitor power converter until the voltage across the corresponding charge pump capacitor is approximately equal to a target voltage.

2. The invention of claim 1, further including a ground connection subcircuit configured to selectively couple the coupled charge pump capacitor to, or uncouple the coupled charge pump capacitor from, circuit ground.

3. The invention of claim 1, further including a comparator coupled to the current charge/discharge circuit, the comparator configured to output a signal indicative of the relative values of the output voltage of the switched-capacitor power converter with respect to a feedback voltage, wherein the comparator output signal enables coupling of one of the constant current source or the constant circuit sink to the coupled charge pump capacitor.

4. The invention of claim 3, wherein a change in value of the comparator output signal disables coupling of at least one of the constant current source and the constant circuit sink from the corresponding charge pump capacitor.

5. The invention of claim 3, further including a ground connection subcircuit configured to selectively couple the coupled charge pump capacitor to, or uncouple the coupled charge pump capacitor from, circuit ground, wherein the ground connection subcircuit is configured to uncouple the coupled charge pump capacitor from circuit ground after the comparator output signal changes value.

6. The invention of claim 3, further including a scaling circuit configured to generate the feedback voltage as a scaled version of the voltage across the coupled charge pump capacitor.

7. The invention of claim 6, wherein the scaling circuit includes a resistive voltage divider.

8. The invention of claim 1, further including a comparator coupled to the current charge/discharge circuit, the comparator including a first input coupled to the output voltage of the switched-capacitor power converter and a second input coupled to a feedback voltage derived from the voltage across the coupled charge pump capacitor, the comparator configured to output a signal indicative of the relative values of the output voltage of the switched-capacitor power converter with respect to the feedback voltage.

9. A charge balance circuit configured to be coupled to a corresponding charge pump capacitor within a switched-capacitor power converter, including:

(a) a comparator having a first input coupled to an output voltage of the switched-capacitor power converter, a second input coupled to a feedback voltage derived from a voltage across the corresponding charge pump capacitor, and a comparator output signal that provides a signal indicative of the relative values of the output voltage of the switched-capacitor power converter with respect to the feedback voltage;

(b) a ground connection subcircuit configured to selectively couple the corresponding charge pump capacitor to, or uncouple the corresponding charge pump capacitor from, circuit ground;

(c) a constant current charge circuit coupled to the comparator and selectively couplable to the corresponding charge pump capacitor in response to a first value of the comparator output signal;

(d) a constant current discharge circuit coupled to the comparator and selectively couplable to the corresponding charge pump capacitor in response to a second value of the comparator output signal; and (e) a digital controller coupled to the comparator output, the digital controller configured to disable at least one of the constant current charge circuit and the constant current discharge circuit after the comparator output changes state.

10. The invention of claim 9, wherein the ground connection subcircuit is configured to uncouple the corresponding charge pump capacitor from circuit ground after the comparator output changes value.

11. The invention of claim 9, further including a scaling circuit configured to generate the feedback voltage as a scaled version of the voltage across the corresponding charge pump capacitor.

12. The invention of claim 11, wherein the scaling circuit includes a resistive voltage divider.

13. A switched-capacitor power converter, including:

(a) at least one charge pump capacitor; and (b) at least one charge balance circuit coupled to a corresponding one of the at least one charge pump capacitor, each charge balance circuit including a current charge/discharge circuit configured to provide either a constant current source or a constant current sink to the corresponding charge pump capacitor as a function of both a voltage across the corresponding charge pump capacitor and an output voltage of the switched-capacitor power converter until the voltage across the corresponding charge pump capacitor is approximately equal to a target voltage.

14. The invention of claim 13, further including a ground connection subcircuit coupled to the corresponding charge pump capacitor, the ground connecting subcircuit configured to selectively couple the corresponding charge pump capacitor to, or uncouple the corresponding charge pump capacitor from, circuit ground.

15. The invention of claim 13, further including a comparator coupled to the current charge/discharge circuit, the comparator configured to output a signal indicative of the relative values of the output voltage of the coupled switched-capacitor power converter with respect to the feedback voltage, wherein the comparator output signal enables coupling of one of the constant current source or the constant circuit sink to the corresponding charge pump capacitor.

16. The invention of claim 15, wherein a change in a value of the comparator output signal disables coupling of at least one of the constant current source and the constant circuit sink from the corresponding charge pump capacitor.

17. The invention of claim 15, further including a ground connection subcircuit coupled to the corresponding charge pump capacitor, the ground connecting subcircuit configured to selectively couple the corresponding charge pump capacitor to, or uncouple the corresponding charge pump capacitor from, circuit ground, wherein the ground connection subcircuit is configured to uncouple the corresponding charge pump capacitor from circuit ground after the change in value of the comparator output signal.

18. The invention of claim 15, further including a scaling circuit configured to generate the feedback voltage as a scaled version of the voltage across the corresponding charge pump capacitor.

19. The invention of claim 18, wherein the scaling circuit includes a resistive voltage divider.

20. The invention of claim 13, further including a comparator coupled to the current charge/discharge circuit, the comparator including a first input coupled to the output voltage of the switched-capacitor power converter and a second input coupled to a feedback voltage derived from the voltage across the corresponding charge pump capacitor, the comparator configured to a output a signal indicative of the relative values of the output voltage of the coupled switched-capacitor power converter with respect to the feedback voltage, wherein the comparator output signal enables coupling of one of the constant current source or the constant circuit sink to the corresponding charge pump capacitor.

21. A method for balancing charge across a charge pump capacitor within a switched-capacitor power converter, including:
(a) coupling one of a constant current source or a constant current sink to the charge pump capacitor in response to comparing an output voltage of the switched-capacitor power converter to a feedback voltage derived from a voltage across the charge pump capacitor; and
(b) de-coupling the constant current source and the constant current sink from the charge pump capacitor after the voltage across the charge pump capacitor is approximately equal to a target voltage.

* * * * *